Dec. 4, 1945. J. T. MARVIN 2,390,160
METHOD OF MANUFACTURE
Filed July 10, 1943

INVENTOR
JOHN T. MARVIN
BY
His ATTORNEYS

Patented Dec. 4, 1945

2,390,160

UNITED STATES PATENT OFFICE 2,390,160

METHOD OF MANUFACTURE

John T. Marvin, Dayton, Ohio, assignor to General Motors Corporation, Detroit, Mich., a corporation of Delaware Application July 10, 1943, Serial No. 494,236

13 Claims. (Cl. 29—149.5)

This invention relates to a method of making porous metal objects and is particularly concerned with the method of making hollow cylindrical objects and the like.

It is an object of the invention to provide a simple and inexpensive method of making hollow cylindrical objects from metal powder wherein the metal powder is not in highly compacted condition.

In carrying out the above object it is a further object to distribute the metal powder centrifugally and thereby form a hollow cylindrical object quickly and inexpensively.

A further object is to provide a method for centrifugally forming cylindrical hollow objects from metal powder wherein the sintering takes place remote from the centrifuging apparatus.

Another object of the invention is to provide a new and improved method of making composite cylindrical objects without the use of cores and the like.

Further objects and advantages of the present invention will be apparent from the following description, reference being had to the accompanying drawing wherein preferred embodiments of the present invention are clearly shown.

Figure 1:
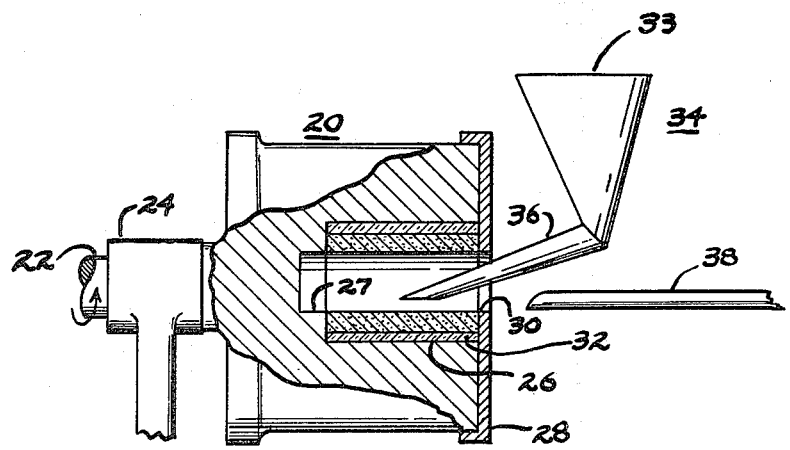
Fig. 1 is a partial view in section of one type of centrifuge which may be used in forming hollow cylindrical objects, showing the object in place therein together with the leveling and feeding mechanism.

In copending application, Serial No. 408,667, filed August 28, 1941, and assigned to the assignee of the present invention, a method and apparatus is shown for centrifugally forming hollow cylindrical objects from metal powders wherein the sintering of the object takes place in the centrifuge while the same is rotating at high speed. This invention is directed to the manufacture of similar articles but permits sintering at a place remote from the centrifuge wherein the hollow cylindrical object is formed.

In the past highly porous metal objects of the hollow cylindrical shape have been formed by molding non-compacted metal powder in a non-adhering mold; for example, a graphite mold, whereby the article after sintering could be removed from the mold. Molds are necessary when operating on loose non-compacted powder since the metal powder does not cohere together to form a self-sustaining object as occurs in operations on briquetted metal powders. Therefore, in the manufacture of highly porous articles from non-compacted articles it has been the usual practice in the past to provide a mold. The aforementioned copending application, Serial No. 408,667, circumvents this necessary procedure by utilizing a centrifuge in which the powder is placed in predetermined quantities and then rotated so that the powder is distributed and held adjacent the walls of the centrifuge. An inductive heating apparatus is then placed over the centrifuge and the powder sintered during the rotation thereof. After sintering, a refractory receptacle, which holds the metal powder, is removed with the sintered article therein and the article is then removed therefrom. This invention is particularly concerned with sintering of the article remote from the centrifuge after formation whereby the article can be sintered in a conventional type sintering furnace and the centrifuge can be utilized to form a plurality of similar articles.

In order to accomplish this end I provide a suitable centrifuge 20 which is rotated on shaft 22 that is connected to a power source, not shown. The shaft 22 is journaled in a bearing 24. The centrifuge 20 includes a central bore 26 therein having two diameter portions 26 and 27 and a cover 28 which has a central aperture 30 therethrough of the same diameter as the portion 27 of bore 26. A removable retaining shell 32 is provided which is a snug fit within the bore 26 of the centrifuge. This shell may be made of any non-adhering material such as oxidized chrome steel or chrome-plated steel, alundum, graphite or other suitable heat resisting metal, dusted with alundum powder for example, to prevent adherence. Another expedient which may be utilized is a retaining shell, such as an asbestos paper shell which will retain the contents in shape until sintering has occurred and will then char and distintegrate. Shells of this character can be readily produced in production at low cost.

Figure 2:
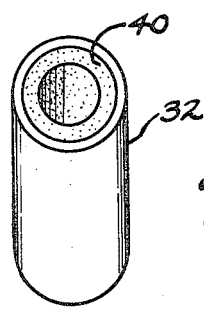
Fig. 2 is a view of the molded metal powder in its container or receptacle after removal from the centrifuge.
Figure 3:
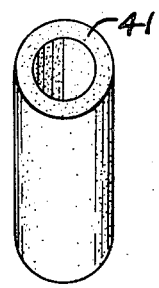
Fig. 3 is a view of the finished hollow cylindrical object; in this case a porous metal bearing and, Fig. 4 is a view of a composite cylindrical object; in this case a steel backed bearing having a porous metal lining.
Figure 4:
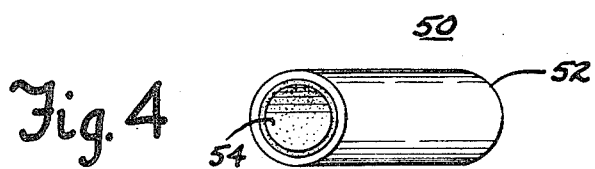

In the manufacture of articles by my method I first place the shell 32 in bore 26 and start rotating the centrifuge. I next place a mixture of the metal powder with a binder and its solvent in the form of a flowable slurry in hopper 33 of the feeding device 34. When the centrifuge has obtained speed, suitable valving mechanism, not shown, is opened and the metal powder and binder are allowed to flow through feed pipe 36 into the centrifuge. A predetermined quantity of the powder slurry is introduced and then the feeding apparatus 34 is removed and a leveling blade 38 is inserted which may rest on the wall of the aperture 30 and on the wall of the smaller diameter portion 27 of the bore 26. Sufficient powder is placed in the centrifuge so that the same will be substantially level and fill the shell to bring the diameter of the powder layer to the diameter of aperture 30 of the cover 28. After the blade 38 is removed I next propose to introduce a suitable preferably warm atmosphere into the centrifuge cavity to evaporate the binder solvent. This can be done in a very short period and will cause the metal particles to cohere together by means of the binder and likewise to adhere to the shell 32. The centrifuge may then be stopped and the shell removed with a hollow cylindrical form 40 of metal powder therein. This assembly is shown in Fig. 2. The shell and the metal powder may then be placed in a conventional sintering furnace and sintered under well known procedures to cause the metal particles to alloy or cohere and form a highly porous metal object 41. If the retaining shell is paper, the paper will be destroyed. However, if the shell is of some other material, the cylindrical object 41 after sintering may be removed therefrom. In some cases it may be desirable to use a split shell similar to that shown in the aforementioned copending application or to use a shell having draft which will permit removal of the porous metal after sintering.

For a binder I prefer to use organic lacquer in a solvent which binder may be termed a temporary binder since it will be decomposed upon heating and disappear from the article being sintered. It has been found that this binder will hold the shape of the article until such time, at least, as superficial bonding between the particles occurs, so that the shape of the article is maintained. Any suitable lacquer can be used and I have found that pyroxylin, for example, dissolved in an organic solvent forms a satisfactory binder. The binder is preferably mixed with the solvent and the metal particles to form a slurry which will flow easily into the centrifuge. The solvent should be chosen from that class of organic solvents which is highly volatile so that evaporation is rapid when the warm atmosphere is introduced into the centrifuge.

Any of the usual types of metal powders can be utilized in this method. Powders such as copper and tin mixed so as to form a bronze upon sintering or prealloyed powder, that is, copper covered with a coating of tin can be used. Likewise iron particles with copper, nickel and copper and any of the usual and well known combinations of the metal powders may be used to form objects by this method. The sintering procedures are well known in the art and suffice to say that when two metals of different melting points are utilized it is preferable to have an excess of the highest melting point metal and then to sinter the object formed therefrom at a temperature intermediate the melting points. For example, in a copper-tin combination where the mixture contains in the neighborhood of 90 parts copper and 10 parts tin, a temperature between 1550 and 1750° F., is a suitable sintering temperature. Likewise when using copper and iron wherein the iron forms in the neighborhood of between 90 and 95% and copper 10 to 5%, a sintering temperature of 2050° F. is suitable. Copper-nickel mixtures wherein nickel is used in quantities in the neighborhood of 60% with copper forming the remainder, can be sintered at a temperature of 2000° F. It will be noted that in each example given the higher melting point metal is predominant and the sintering temperature is chosen below the melting point of the predominant metal but above the melting point of the lower melting point metal. In all cases a sintering time of from 15 minutes to a half hour is satisfactory and sintering should be carried out under non-oxidizing conditions and preferably in an atmosphere which has a reducing nature and wherein the water vapor content is maintained less than one pound of water per 1000 feet of atmosphere used. In any of the examples noted the powders may be mixed as two separate powders or may be partially pre-alloyed or pre-attached in accordance with the alloying characteristics of the powders. It is preferred that pre-alloyed or attached powder be utilized in this method since it is apparent that when a mixture of two powders is used that the powder particles having different densities tend to segregate upon centrifuging which causes a non-uniform composition throughout the object manufactured. If mixtures of powder are used therefor, the slurry should be heavy and thick and the initial smoothing out of the powder by the leveling device 38 should be done at sufficiently low speed to assure proper distribution of the powder in the shell after which the leveling device may be removed and the speed of the centrifuge stepped up to its normal speed. A thick slurry will prevent migration of the heavier particles of metal toward the shell during centrifuging. It is preferable to arrive at the viscosity of the binder utilized by testing the flowability of the slurry by trial so that the best results are obtained after which controlled conditions may be maintained to provide uniform production.

Another embodiment of my invention consists in the use of a solid metal as the supporting shell. In this connection the shell 32 consists of steel, nickel, Monel metal, copper and the like. The metal powders in a slurry with a suitable organic binder are then centrifugally distributed as hereinbefore described, after which the solvent in the binder for the powder is evaporated and the metal shell with the powders therein is removed and placed in a suitable sintering furnace whereupon the metal powder is sintered, the binder decomposed and the metal powder layer, which is now porous metal, is simultaneously bonded metallurgically to the shell. Obviously, the shell must be of a metal which will remain solid at the particular sintering temperature. In this connection, an article is formed, for example, a composite bearing shown at 50 having a steel outer shell 52 with a porous metal liner 54 bonded therein. It is a well-known fact, that metal powder, when held in contact with steel or other metals, will tend to bond thereto during the sintering period. I have found, that when using a copper-tin mixture, that steel presents a satisfactory supporting shell. Nickel and Monel may likewise be used as they are metals having sufficiently high melting point to withstand the sintering temperatures.

In connection with this embodiment I have found that bonding will be expedited if the surface of the steel is made clean and free from oil and oxides. In some cases, it may be desirable to copper-plate the inside of the steel shell or to coat the same with a layer of tin or lead. This can be accomplished by electro-plating.

While the embodiments of the present invention as herein disclosed, constitute preferred forms, it is to be understood that other forms might be adopted, all coming within the scope of the claims which follow.

What is claimed is as follows:

1. In a method of forming hollow cylindrical objects from non-compacted metal powder, the steps of: mixing the metal powder with a volatile organic solvent and a binder to form a slurry, supplying a predetermined quantity of said slurry to a retaining shell held within a centrifuge, rotating the shell with the powder therein for centrifugally distributing the powder to form a hollow cylindrical shape and simultaneously evaporating the solvent, removing the shell with the formed object therein and then sintering the object under suitable conditions of time, temperature and atmosphere for decomposing the binder and causing the particles of metal in the object to sinter together and form a hollow cylindrical object.

2. In a method of making hollow cylindrical objects from non-compacted metal powders, the steps of: mixing metal powder with an organic binder in a solvent, supplying a predetermined quantity of said mixture to a centrifuge and forming a hollow cylindrical object therein, evaporating the solvent while maintaining the object in shape by rotating said centrifuge, removing the bound together metal powder from the centrifuge, and then sintering under suitable conditions of time, temperature and atmosphere for decomposing the binder and for simultaneously sintering the metal particles in the object together to form a highly porous cylindrical object.

3. In the method of making hollow cylindrical objects from non-compacted metal powder, the steps of: forming a slurry of metal powder with a binder in a solvent, centrifuging a predetermined quantity of the mixture thereof for forming a hollow cylindrical object, evaporating the solvent while maintaining the object in shape, removing the bound together metal powder from the centrifuge and then sintering under suitable conditions of time, temperature and atmosphere for causing the metal powder to sinter together into a highly porous cylindrical object.

4. In the method of making hollow cylindrical objects, from non-compacted metal powder, the steps of: forming a mixture of metal powder, binder and a volatile solvent, flowing a given quantity of said mixture into a retaining shell, rotating the shell with the mixture therein with sufficient speed to distribute the mixture adjacent the walls of the shell, concurrently evaporating the solvent so as to form a hollow cylindrical object bound to the walls of the shell, sintering the metal powder within the shell under suitable conditions of time, temperature and atmosphere for causing the powder metal to sinter together into a highly porous metal object.

5. The method as claimed in claim 4, together with the added step of removing the object from the shell after the sintering step.

6. In a method of making composite, hollow, cylindrical articles including a layer of sintered non-compacted metal powder bonded to a strong metal supporting shell, comprising the steps of: forming a mixture of metal powder, binder and a volatile solvent, disposing a predetermined quantity of said mixture within a strong metal supporting shell, rotating the shell at a speed sufficient to cause distribution of the powder mixture adjacent the walls of the shell to form a uniform layer therearound, evaporating the solvent while rotating the shell for causing the binder to bind the metal powder particles together and simultaneously to bind the layer of metal powder particles to the shell, heating the shell with the metal powder layer therein under suitable conditions of time, temperature and atmosphere for causing the metal powder particles to sinter together and simultaneously to cause the porous layer to metallurgically bond to the shell.

7. In a method of forming a hollow, cylindrical object from substantially non-compacted metal powder, the steps of: preparing a binder solution by mixing a binder with a volatile solvent, adding metal powder to said solution to form a mixture of the desired consistency to permit flowability of the mixture, supplying a predetermined quantity of the mixture to a retaining shell, rotating the shell with the mixture therein and simultaneously operating upon the powder to distribute the same into a layer of substantially uniform thickness around the shell, continuing to rotate the shell at a speed sufficient to maintain the powder layer adjacent the walls of the shell, while simultaneously evaporating the solvent from the binder, cohering the metal powder into a cylindrical layer by causing the binder to bind the metal particles together and to superficially bind the layer to the cylindrical shell, sintering the shell with the metal powder layer therein under suitable conditions of time, temperature and atmosphere for causing the powder to sinter together and form a hollow cylindrical object.

8. The method as claimed in claim 7 together with the added step of removing the object from the shell.

9. In a method of making hollow cylindrical objects from non-compacted metal powder, the steps of: mixing metal powder with a binder in a solvent, providing a heat destructible shell of the desired shape, supplying a predetermined quantity of said mixture to the shell while rotating the shell at a speed sufficient to cause distribution and maintenance of the metal powder around the inner periphery of the shell, evaporating the solvent so that the metal powder layer adheres to the inner surface of the shell, and then heating the shell with a metal powder layer therein under suitable conditions of time, temperature and atmosphere for causing destruction of the shell, and simultaneously sintering said metal powder layer into a highly porous cylindrical object.

10. In the method of making composite articles having a substantially hollow cylindrical shape and including a steel supporting shell lined with highly porous metal, the steps of: mixing metal powder with a binder in a solvent, distributing a predetermined quantity of said mixture within a steel shell by rotating the shell with the mixture therein at a speed sufficient to distribute and maintain the mixture adjacent the inner surface of the shell, evaporating the solvent so that the metal powder and binder adhere to the shell in a uniform layer therearound, heating the shell with the metal powder layer therein under suitable conditions of time, temperature and atmosphere for causing the metal powder to sinter together into a highly porous layer and simultaneously metallurgical bond to the steel supporting shell.

11. In a method of forming hollow cylindrical objects from non-compacted metal powder, the steps of: supplying a predetermined quantity of a mixture of metal powder with a binder and a solvent to a heat destructible retaining shell, distributing the metal powder around the inner surface of said shell and maintaining the powder in position by rotation of the shell, removing the binder while the shell is rotating to cause the powder to mechanically adhere to the surface of the shell, and then heating the shell with the metal powder therein under suitable conditions of time, temperature and atmosphere for causing the metal powder to sinter together into a highly porous cylindrical shape and simultaneously destroying the shell.

12. The method as claimed in claim 7 together with the added step of simultaneously metallurgicaly bonding the metal powder layer to the shell during the sintering step.

13. In the method of forming a hollow cylindrical object from substantially non-compacted metal powder comprising the steps of; mixing metal powder with a binder to form a slurry, distributing the slurry within a retaining shell to form an annular layer while the shell is rotating, continuing rotation of the shell at a speed sufficient to maintain the metal powder layer in place and for simultaneously causing the binder to bind the metal powder to the shell, heating the shell with the metal powder layer therein under suitable conditions of time, temperature and atmosphere for causing the metal powder to sinter together and form a hollow cylindrical object and simultaneously decomposing the binder and finally cooling the porous metal object so formed under suitable conditions.

JOHN T. MARVIN.